United States Patent
Tomokiyo et al.

(10) Patent No.: US 8,428,099 B2
(45) Date of Patent: Apr. 23, 2013

(54) WIRELESS COMMUNICATION SYSTEM AND FREQUENCY HOPPING METHOD THEREFOR, AND BASE STATION AND MOBILE STATION

(75) Inventors: Ryo Tomokiyo, Tokyo (JP); Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1388 days.

(21) Appl. No.: 12/115,154

(22) Filed: May 5, 2008

(65) Prior Publication Data

US 2008/0279258 A1 Nov. 13, 2008

(30) Foreign Application Priority Data

May 9, 2007 (JP) .................................. 2007-124027

(51) Int. Cl.
*H04B 1/00* (2006.01)
(52) U.S. Cl.
USPC ............................. 375/133; 375/132; 375/130
(58) Field of Classification Search .................. 375/133, 375/132, 130, 202, 200; 455/33, 53, 54, 455/49, 56
See application file for complete search history.

(56) References Cited

U.S. PATENT DOCUMENTS

| | | | |
|---|---|---|---|
| 5,909,640 A | 6/1999 | Farrer et al. | |
| 6,061,389 A * | 5/2000 | Ishifuji et al. | 375/133 |
| 6,577,615 B1 * | 6/2003 | Ritter et al. | 370/342 |
| 6,597,725 B1 | 7/2003 | Ishii | |
| 7,142,580 B1 * | 11/2006 | Balachandran et al. | 375/132 |
| 2004/0066737 A1 * | 4/2004 | Sakaishi | 370/206 |
| 2006/0013285 A1 | 1/2006 | Kobayashi et al. | |
| 2007/0268976 A1 * | 11/2007 | Brink et al. | 375/260 |
| 2008/0279259 A1 | 11/2008 | Kobayashi et al. | |

FOREIGN PATENT DOCUMENTS

| | | |
|---|---|---|
| JP | 7-321710 A | 12/1995 |
| JP | 2004-69297 A | 3/2004 |
| JP | 2006-33480 A | 2/2006 |
| KR | 10-2006-0133453 A | 12/2006 |
| WO | 2006/014342 A2 | 2/2006 |

OTHER PUBLICATIONS

Japanese Office Action issued in corresponding Japanese Office Action No. 2007-124027 on Sep. 13, 2011.

* cited by examiner

*Primary Examiner* — Zewdu Kassa
(74) *Attorney, Agent, or Firm* — Sughrue Mion, PLLC

(57) ABSTRACT

In a wireless communication system, a control unit (17) of a base station (1) sets a frequency hopping cycle longer than a predetermined value during a certain measurement interval in which an measurement of a frequency drift is conducted, allowing reception of a plurality of reference signals of the same frequency in receiving an uplink signal from a mobile station (2). The control unit (17) controls a reference signal extraction unit (15) and a reference signal phase difference calculation unit (16) so as to measure, based on the plurality of reference signals, the phase shift amount of a received signal at the same frequency. Thus, the wireless communication system can measure the phase shift amount by controlling the frequency hopping.

20 Claims, 4 Drawing Sheets

WIRELESS COMMUNICATION SYSTEM AND FREQUENCY HOPPING METHOD THEREFOR, AND BASE STATION AND MOBILE STATION

This application is based upon and claims the benefit of priority from Japanese patent application No. 2007-124027, filed on May 9, 2007, the disclosure of which is incorporated herein its entirety by reference.

BACKGROUND OF THE INVENTION

1. Field of the Invention

The present invention relates to a wireless communication system and a frequency hopping method therefor, and a base station and a mobile station, and more particularly, to a wireless communication system to which frequency hopping is applied and a frequency hopping method therefor, and a base station and a mobile station.

2. Description of the Related Art

FIG. 1 is a timing chart exemplifying frequency hopping used in a related wireless communication system. FIG. 1 illustrates as an example a case where a transmit carrier frequency is changed every one time slot (one slot) on the transmitting side.

As illustrated in FIG. 1, each of time slots 100 (100-1 to 100-3) includes a reference signal 101 and data and control signals 102. The reference signal 101 represents a so-called "pilot signal".

Referring to FIG. 1, illustrated is a case where the transmit carrier frequency is f1 during a time slot 100-1, the transmit carrier frequency falls to f3 during a subsequent time slot 100-2, and the transmit carrier frequency rises to f2 during a further subsequent time slot 100-3 (where f1>f2>f3).

In this manner, in the wireless communication system to which the frequency hopping method is applied, the transmit carrier frequency is shifted up and down in accordance with a predetermined pattern.

In such a wireless communication system as described above, by correcting a difference between a transmit carrier frequency from a mobile station and a received carrier frequency on a base station side, an uplink (direction from mobile station to base station) receive function on the base station side can be improved.

For example, when a frequency drift between the mobile station and the base station is 1 kHz and the length of a time slot is 0.5 ms, a baseband received signal appears to have rotated by 180° (i.e. 0.5 ms×1 kHz×360°=180°) during one time slot. As a result, the frequency drift causes deterioration of receiving characteristics in a case where a signal modulated by binary phase shift keying (BPSK), quadrature phase shift keying (QPSK), or the like is subjected to a phase judgment.

As one exemplary method of correcting the frequency drift in a receiver, there is known an automatic frequency control (AFC). With a common method for the AFC, the base station observes a phase shift amount of a received signal that is regularly transmitted from the mobile station and corresponds to a known pilot signal, and rotates in antiphase the received signal by the observed phase shift amount, thereby correcting the frequency drift of the received signal.

Meanwhile, Japanese Laid-Open Patent Publication No. 2004-069297 A (Patent Document 1) discloses an example of a technique in which a measurement period is switched over, while Japanese Laid-Open Patent Publication No. 07-321710 A (Patent Document 2) discloses an example of another technique in which a period of hopping frequency switching is changed.

The technique disclosed in Patent Document 1 relates to an apparatus for measuring a gas flow rate, in which a measurement period of a flow rate is switched over between a continuous period and an intermittent period according to the size of the initial flow rate. To give an example, when the flow rate is large and a measurement period immediately before is the intermittent period, the measurement period is switched to the continuous period.

The other technique disclosed in Patent Document 2 relates to higher speed synchronization acquisition for a communication apparatus that uses a frequency hopping method. In the technique, switching periods of hopping frequency allocated to the first three codes from the head of each spread code series that is output from a spread code generating circuit is set shorter than switching periods of hopping frequency allocated to the other codes.

However, regarding the wireless communication system in which frequency hopping is conducted on a time slot basis as illustrated in FIG. 1, the phase of a received signal on the base station side is changed according to the change of frequency. Therefore, the system has a problem in that a phase shift amount at the same frequency in a frequency hopping system cannot be measured.

Meanwhile, the techniques disclosed in Patent Documents 1 and 2 are techniques in which a measurement period and a hopping period are switched over, respectively, but any of those techniques is quite different in object and configuration from the present invention. Thus, those techniques are different from the present invention, which cannot achieve the same effect as the present invention.

SUMMARY OF THE INVENTION

The present invention has been made in view of the above, and therefore has an exemplary object to provide a wireless communication system that makes it possible to measure a phase shift amount for correcting a frequency drift of a received signal and a frequency hopping method therefor, and a base station and a mobile station.

In order to solve the above-mentioned problem, according to an exemplary aspect of the present invention, a wireless communication system to which frequency hopping is applied includes, in a receiving side device, setting means for setting a frequency hopping cycle so that the receiving side device can measure a phase shift amount of a received signal.

In the wireless communication system, during a certain measurement interval in which an estimation (or measurement) of a frequency drift is conducted, a frequency hopping cycle is set longer than a predetermined value, allowing a receiving side to receive a plurality of reference signals at the same frequency. Based on the plurality of reference signals, the phase shift amount of a received signal at the same frequency is measured. Therefore, the wireless communication system allows measurement of the phase shift amounts before and after the frequency hopping.

DETAILED DESCRIPTION OF THE EXEMPLARY EMBODIMENTS

Hereinafter, a description is made of exemplary embodiments of the present invention with reference to the drawings.
[First Exemplary Embodiment]

Figure 2:
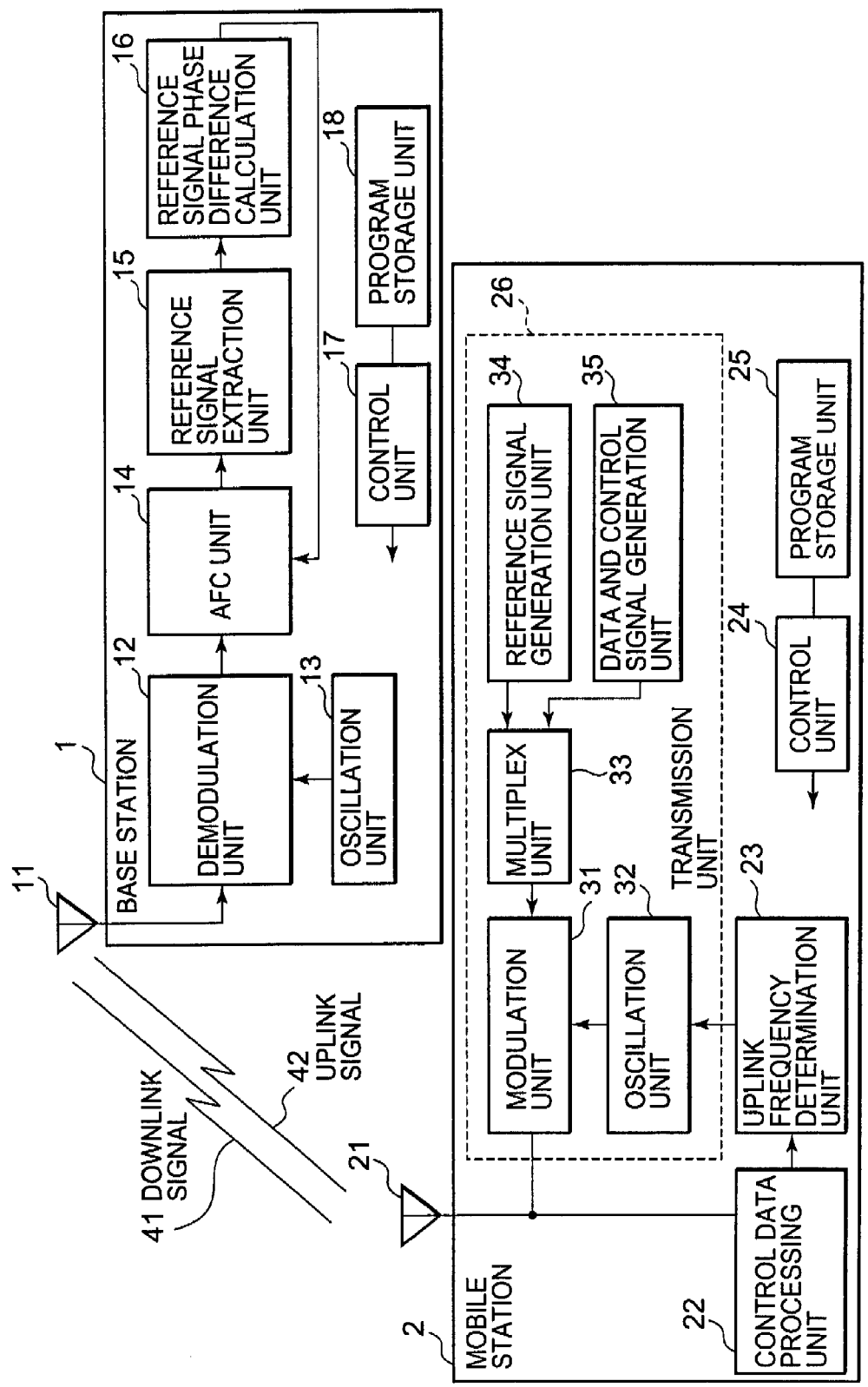
FIG. 2 is a configuration diagram of a wireless communication system according to a first exemplary embodiment of the present invention.

FIG. 2 is a configuration diagram of a wireless communication system according to a first exemplary embodiment of the present invention. Referring to FIG. 2, the wireless communication system is a wireless communication system to which frequency hopping is applied, and includes a base station 1 and a mobile station 2. The base station 1 can serve as a receiving side device while the mobile station 2 can serve as a transmitting side device.

The base station 1 includes an antenna 11, a demodulation unit 12, an oscillation unit 13, an automatic frequency control (AFC) unit 14, a reference signal extraction unit 15, a reference signal phase difference calculation unit 16, a control unit 17, and a program storage unit 18.

The control unit 17 controls the respective components 12 to 16. The program storage unit 18 is described below.

It should be noted that though FIG. 2 illustrates only the configuration of a reception unit of the base station 1, the base station 1 also includes a transmission unit in actuality. However, the configuration of the transmission unit is irrelevant to the present invention, and thus the illustration thereof is omitted.

The mobile station 2 includes an antenna 21, a control data processing unit 22, an uplink frequency determination unit 23, a control unit 24, a program storage unit 25, and a transmission unit 26. The control data processing unit 22 and the uplink frequency determination unit 23 are included in a reception unit (not shown).

The control unit 24 controls the respective components 22, 23, and 31 to 35. The program storage unit 25 is described below.

The transmission unit 26 includes a modulation unit 31, an oscillation unit 32, a multiplex unit 33, a reference signal generation unit 34, a data and control signal generation unit 35.

In the mobile station 2, the reference signal generation unit 34 generates a known reference signal, and the data and control signal generation unit 35 generates transmit data and control information to be transmitted to the base station 1. The generated reference signal, transmit data, and control information are time-multiplexed by the multiplex unit 33, modulated by the modulation unit 31 based on a modulation frequency generated by the oscillation unit 32, and transmitted to the base station 1 via the antenna 21.

The modulation frequency generated by the oscillation unit 32 is determined by the uplink frequency determination unit 23 according to a processing result from the control data processing unit 22, which processes frequency information provided by the base station 1 with use of a downlink (direction from base station to mobile station) signal 41.

According to the first exemplary embodiment, an AFC measurement (or estimation) period is provided by setting a frequency hopping cycle, which is specified by the base station 1, longer.

Figure 1:
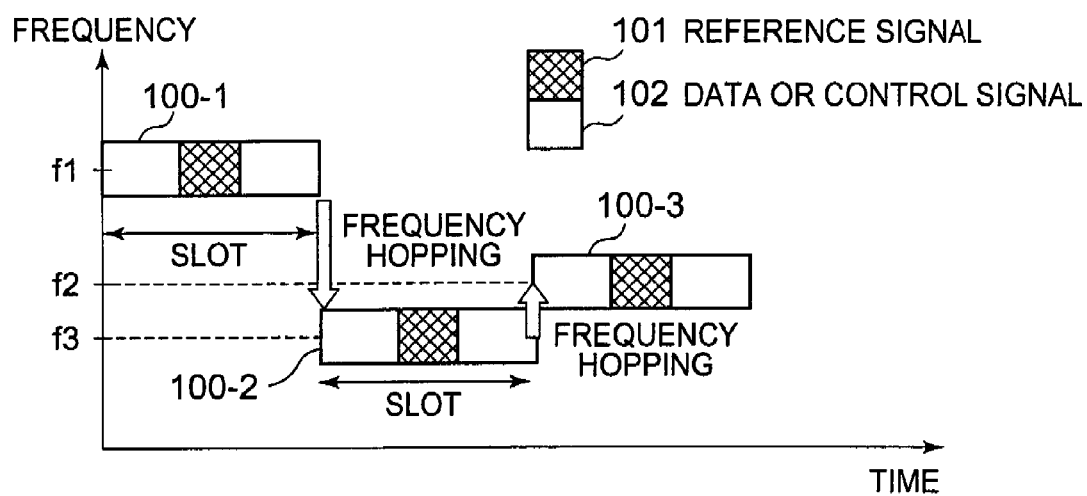
FIG. 1 is a timing chart exemplifying frequency hopping applicable to a related wireless communication system.
Figure 3:
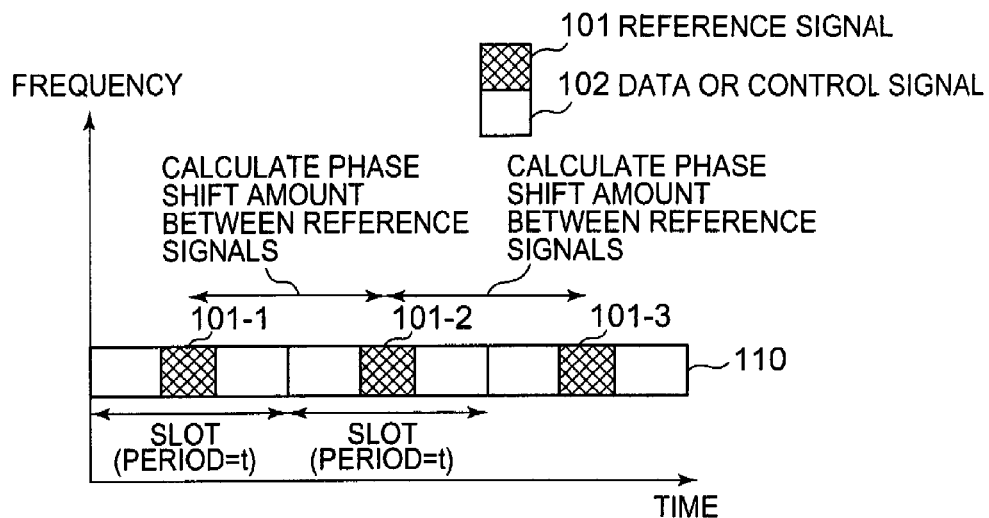
FIG. 3 is a timing chart exemplifying frequency hopping applicable to the wireless communication system of FIG. 2.

FIG. 3 is a timing chart exemplifying frequency hopping applicable to the wireless communication system of the first exemplary embodiment. It should be noted that, in FIG. 3, the same numerals are used to denote the similar components to those of FIG. 1, and the description thereof is omitted.

As illustrated in FIG. 3, the frequency hopping cycle is set longer in a manner that a plurality of reference signals (in FIG. 3, three reference signals 101-1 to 101-3 by way of example) are transmitted at the same frequency. In other words, by setting longer the frequency hopping cycle that is specified by the base station 1 with respect to the mobile station 2, the AFC measurement period is provided to the base station 1.

Referring back to FIG. 2, in the base station 1, an uplink signal 42 transmitted from the mobile station 2 is converted to a baseband signal by means of a frequency generated by the oscillation unit 13, and then demodulated by the demodulation unit 12. A difference between a frequency of the oscillation unit 32 in the mobile station 2 and a frequency of the oscillation unit 13 in the base station 1 is recognized in the baseband signal as a frequency drift.

For example, assuming that the frequency drift is $\Delta f$ (Hz), the phase of the baseband signal appears to have rotated by $2\pi t\Delta f$ (rad) in a period of one slot (period=t) illustrated in FIG. 3.

The reference signal extraction unit 15 of the base station 1 extracts a phase from a received baseband signal corresponding to known reference signals, and subsequently, the reference signal phase difference calculation unit 16 calculates a phase shift amount of the received signal corresponding to the reference signals in terms of time.

The AFC unit 14 rotates in antiphase the received baseband signal by the phase shift amount calculated by the reference signal phase difference calculation unit 16, thereby conducting correction.

To give a more specific description, with a related frequency hopping method, in which only one reference signal is contained in the same frequency, it is impossible to measure a frequency drift (i.e. phase shift) in the event of occurrence of the frequency drift because there is no reference signal to compare with. However, according to the first exemplary embodiment, the frequency hopping cycle is set longer in a manner that a plurality of reference signals are contained in the same frequency, making it possible to measure the phase shift amount of a received signal at the same frequency based on the plurality of reference signals.

Next, a description is made of an operation according to the first exemplary embodiment of the present invention. According to the first exemplary embodiment, the frequency hopping cycle is set to n (e.g. n=1) except during the AFC measurement period whereas the frequency hopping cycle is changed to m (e.g. m=3) during the AFC measurement period (m and n are positive integers: m>n).

Figure 4:
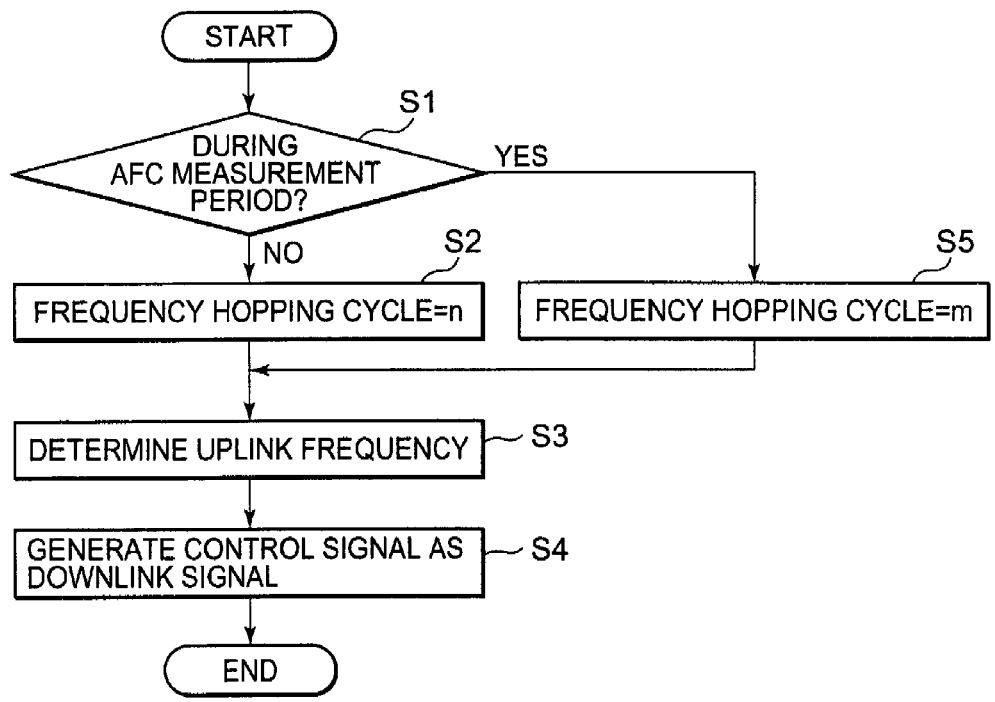
FIG. 4 is a flow chart exemplifying an operation of a base station of the wireless communication system of FIG. 2.

First, a description is made of an example of an operation of the base station 1. FIG. 4 is a flow chart exemplifying the operation of the base station 1. It should be noted that the program storage unit 18 of the base station 1 stores a program to conduct the operation illustrated in the flow chart of FIG. 4. The control unit 17 of the base station 1 executes controlling of the frequency hopping according to the program stored in the program storage unit 18 (see FIG. 1). In other words, the control unit 17 operates as a setting means to execute a step of setting a frequency hopping cycle.

The control unit 17 of the base station 1 checks whether or not it is during the AFC measurement period (Step S1), and, if it is not during the AFC measurement period ("NO" in Step S1), sets the frequency hopping cycle to n (Step S2).

Next, the control unit 17 of the base station 1 determines an uplink frequency (Step S3). That is, the control unit 17 operates as transmit frequency determination means to execute a transmit frequency determination step for determining a transmit frequency as the uplink frequency. Then the control unit 17 operates as control signal generation means to generates a control signal for notifying the mobile station 2 of information of the uplink frequency by means of the downlink signal 41 (Step S4).

On the other hand, during the AFC measurement period ("YES" in Step S1), the control unit 17 of the base station 1 sets the frequency hopping cycle to m (Step S5). The control unit 17 of the base station 1 then executes the above-mentioned Steps S3 and S4.

Figure 5:
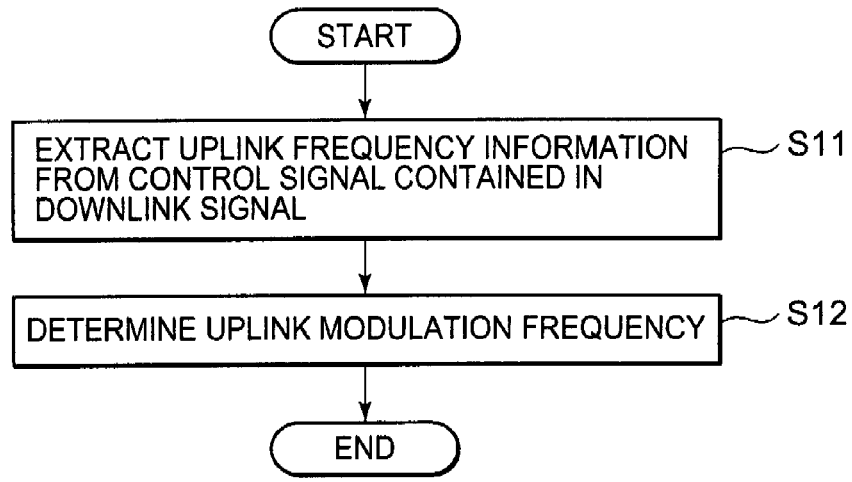
FIG. 5 is a flow chart exemplifying an operation of a mobile station of the wireless communication system of FIG. 2.

Next, a description is made of an example of an operation of the mobile station 2. FIG. 5 is a flow chart exemplifying the operation of the mobile station 2. It should be noted that the program storage unit 25 of the mobile station 2 stores a program to conduct the operation illustrated in the flow chart of FIG. 5. The control unit 24 of the mobile station 2 executes controlling of an uplink modulation frequency according to the program stored in the program storage unit 25 (see FIG. 2).

The control unit 24 of the mobile station 2 extracts the uplink frequency information from the control signal contained in the downlink signal 41 via the control data processing unit 22 (Step S11). That is, the control unit 24 operates as transmit frequency information extraction means to execute a step of extracting the control signal. Then the control unit 24 determines the uplink modulation frequency via the uplink frequency determination unit 23 (Step S12).

Namely, the control unit 24 operates as transmit modulation frequency determination means to execute a step of determining a transmit modulation frequency as the uplink modulation frequency.

As is described above, according to the first exemplary embodiment of the present invention, by providing the AFC measurement period to the wireless communication system to which the frequency hopping is applied, it becomes possible to correct the frequency drift between the mobile station 2 and the base station 1. As a result, improved characteristics of the receive function can be obtained.

[Second Exemplary Embodiment]

Figure 6:
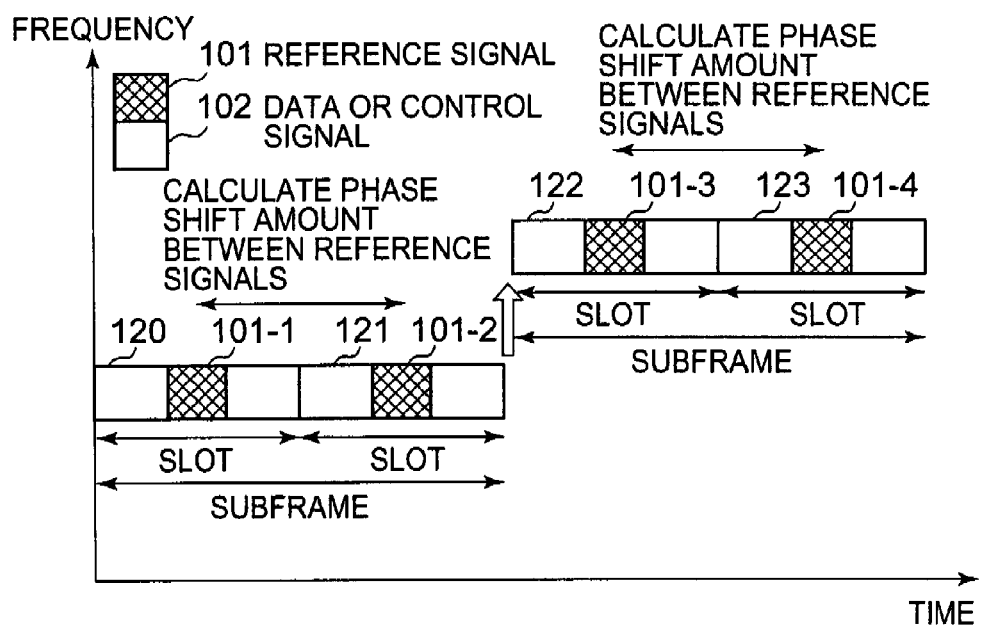
FIG. 6 is a timing chart illustrating an operation of frequency hopping applicable to a wireless communication system according to a second exemplary embodiment of the present invention.

FIG. 6 is a timing chart illustrating an operation of frequency hopping applicable to the wireless communication system according to a second exemplary embodiment of the present invention. It should be noted that, in FIG. 6, the same numerals are used to denote the similar components to those of FIG. 1, and the description thereof is omitted. The wireless communication system has the same configuration as that of FIG. 2.

Referring to FIG. 6, two slots 120 and 121 constitute one subframe, whereas two slots 122 and 123 constitute another subframe. Then, the frequency hopping is executed on a subframe basis.

In this case, the AFC can be executed using the phase shift amount of the received signal based on reference signals 101-1 and 101-2 or reference signals 101-3 and 1014, which constitute a subframe.

Alternatively, a configuration in which a plurality of reference signals 101 are placed in one slot is also possible.

In those ways, when the plurality of reference signals 101 are placed in a subframe or a slot, it is possible to judge whether or not to execute the frequency hopping by observing the phase shift amount of the received signal based on the uplink reference signals 101 at the same frequency.

Also, in a case where a plurality of slots constitute a subframe, when the phase shift amount of the received signal based on the reference signals 101 after the AFC is large, it can be judged that updating of the correction amount of the frequency drift is necessary. Therefore, by means of the processing illustrated in the flow chart of FIG. 4 according to the first exemplary embodiment, the frequency hopping cycle can be set longer, thereby allowing the measurement of the phase shift amount of the received signal based on the reference signals 101 during the subframes.

On the other hand, when the phase shift amount of the received signal based on the reference signals 101 after the AFC is small, it can be judged that the updating of the correction amount of the frequency drift is unnecessary. Thus, the frequency hopping cycle is set shorter.

It should be noted that though the second exemplary embodiment uses a configuration in which one subframe is constituted of two slots, the present invention is not limited thereto, allowing one subframe to be optionally constituted of three or more slots.

As described above, according to the second exemplary embodiment of the present invention, by conducting the frequency hopping on a subframe basis, it is possible to observe the phase shift amount of the received signal based on the uplink reference signals 101 at the same frequency without changing the frequency hopping cycle. In addition, when the phase shift amount is large, the frequency hopping cycle is set longer, thereby allowing the updating of the correction amount of the frequency drift.

[Third Exemplary Embodiment]

In the first and second exemplary embodiments of the present invention, the base station 1 controls the frequency hopping cycle, but a configuration in which the mobile station 2 controls the frequency hopping in the same manner is also possible.

Moreover, it is also possible to provide a frequency drift measurement period at a predetermined timing to the base station 1 and the mobile station 2.

As is described above, according to the third exemplary embodiment of the present invention, it is possible to conduct the frequency hopping control on the mobile station 2 side. Meanwhile, the change of the frequency hopping cycle or the execution of frequency hopping on a subframe basis becomes unnecessary as a result of providing the frequency drift measurement period at a predetermined timing to the base station 1 and the mobile station 2.

[Other Exemplary Embodiments]

The present invention is applicable to a mobile communication system which is constituted of a wireless base station and a mobile station, and to which frequency hopping is applied.

According to another exemplary embodiment, a frequency hopping method for a wireless communication system to which frequency hopping is applied includes the step of setting, in a receiving side device, a frequency hopping cycle so that the receiving side device can measure a phase shift amount of a received signal.

According to still another exemplary embodiment, a base station for a wireless communication system to which frequency hopping is applied includes setting means for setting a frequency hopping cycle so that the base station can measure a phase shift amount of a received signal.

According to further still another exemplary embodiment, a mobile station is for a wireless communication system to which frequency hopping is applied. A frequency hopping cycle is set so that a base station can measure a phase shift amount of a received signal. The mobile station includes transmit frequency information extraction means for extracting transmit frequency information from a control signal transmitted from the base station and transmit modulation frequency determination means for determining a transmit modulation frequency based on the transmit frequency information.

According to still another exemplary embodiment, a program for a frequency hopping method for a wireless communication system to which frequency hopping is applied causes a computer of a receiving side device to execute the step of setting a frequency hopping cycle so that the receiving side device can measure a phase shift amount of a received signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system to which frequency hopping is applied, comprising a receiving side device, wherein the receiving side device comprises:
    a setting means for changing a frequency hopping cycle from a regular cycle to a measuring period so that the receiving side device can measure a phase shift amount of a received signal;
    a transmit frequency determination means for determining a transmit frequency from a transmitting side device; and
    a control signal generation means for generating a control signal to notify the transmitting side device of the transmit frequency.

2. The wireless communication system according to claim 1, wherein the setting means sets, when the frequency hopping is conducted on a slot basis and the slot contains one reference signal, the frequency hopping cycle longer.

3. The wireless communication system according to claim 1, wherein the setting means sets the frequency hopping cycle so that the frequency hopping is conducted on a subframe basis, the subframe including a plurality of slots, each of the plurality of slots including one reference signal.

4. The wireless communication system according to claim 3, wherein the setting means sets, when the frequency hopping is conducted on a subframe basis, the frequency hopping cycle longer.

5. The wireless communication system according to claim 1, further comprising in the transmitting side device:
    a transmit frequency information extraction means for extracting transmit frequency information from the control signal transmitted from the receiving side device; and
    a transmit modulation frequency determination means for determining a transmit modulation frequency based on the transmit frequency information.

6. The wireless communication system according to claim 1, wherein the receiving side device comprises a base station.

7. The wireless communication system according to claim 5, wherein the transmitting side device comprises a mobile station.

8. A frequency hopping method for a wireless communication system to which frequency hopping is applied, comprising the steps of:
    changing, in a receiving side device, a frequency hopping cycle from a regular cycle to a measuring period so that the receiving side device can measure a phase shift amount of a received signal;
    determining, in the receiving side device, a transmit frequency from a transmitting side device; and
    generating, in the receiving side device, a control signal to notify the transmitting side device of the transmit frequency.

9. The frequency hopping method according to claim 8, wherein the step of changing includes setting, when the frequency hopping is conducted on a slot basis and the slot contains one reference signal, the frequency hopping cycle longer.

10. The frequency hopping method according to claim 8, wherein the step of changing includes setting the frequency hopping cycle so that the frequency hopping is conducted on a subframe basis, the subframe including a plurality of slots, each of the plurality of slots including one reference signal.

11. The frequency hopping method according to claim 10, wherein the step of setting includes setting, when the frequency hopping is conducted on a subframe basis, the frequency hopping cycle longer.

12. The frequency hopping method according to claim 8, further comprising the steps of:
    extracting, in the transmitting side device, transmit frequency information from the control signal transmitted from the receiving side device; and
    determining, in the transmitting side device, a transmit modulation frequency based on the transmit frequency information.

13. The frequency hopping method according to claim 8, wherein the receiving side device comprises a base station.

14. The frequency hopping method according to claim 12, wherein the transmitting side device comprises a mobile station.

15. A base station for a wireless communication system to which frequency hopping is applied, comprising:
    a setting means for changing a frequency hopping cycle from a regular cycle to a measuring period so that the base station can measure a phase shift amount of a received signal;
    a transmit frequency determination means for determining a transmit frequency from a mobile station; and
    a control signal generation means for generating a control signal to notify the mobile station of the transmit frequency.

16. The base station according to claim 15, wherein the setting means sets, when the frequency hopping is conducted on a slot basis and the slot contains one reference signal, the frequency hopping cycle longer.

17. The base station according to claim 15, wherein the setting means sets the frequency hopping cycle so that the frequency hopping is conducted on a subframe basis, the subframe including a plurality of slots, each of the plurality of slots including one reference signal.

18. The base station according to claim 17, wherein the setting means sets, when the frequency hopping is conducted on a subframe basis, the frequency hopping cycle longer.

19. A mobile station for a wireless communication system to which frequency hopping is applied, a frequency hopping cycle being changed from a regular cycle to a measuring period so that a base station can measure a phase shift amount of a received signal,
    the mobile station comprising:

a transmit frequency information extraction means for extracting transmit frequency information from a control signal transmitted from the base station; and a transmit modulation frequency determination means for determining a transmit modulation frequency based on the transmit frequency information.

20. A computer program product stored on a non-transitory tangible computer readable medium causing a computer to execute a frequency hopping method for a wireless communication system to which frequency hopping is applied, causing a computer of a receiving side device to execute the steps of:

changing a frequency hopping cycle from a regular cycle to a measuring period so that the receiving side device can measure a phase shift amount of a received signal;

determining a transmit frequency from a transmitting side device; and generating a control signal to notify the transmitting side device of the transmit frequency.

* * * * *